United States Patent [19]

Pflaumer et al.

[11] Patent Number: 4,752,484

[45] Date of Patent: Jun. 21, 1988

[54] DUAL-TEXTURED COOKIE PRODUCTS CONTAINING A UNIQUE SACCHARIDE MIXTURE

[75] Inventors: Phillip F. Pflaumer, Hamilton; James P. Smith, Cincinnati, both of Ohio

[73] Assignee: The Procter & Gamble Company, Cincinnati, Ohio

[21] Appl. No.: 945,606

[22] Filed: Dec. 23, 1986

[51] Int. Cl.$^4$ ............................................. A21D 13/08
[52] U.S. Cl. ...................................... 426/94; 426/549; 426/560; 426/558
[58] Field of Search .................... 426/94, 549, 560, 558

[56] References Cited

U.S. PATENT DOCUMENTS

| | | |
|---|---|---|
| 3,728,132 | 4/1973 | Tsuyama et al. |
| 3,733,208 | 5/1973 | Sato et al. |
| 4,233,321 | 11/1980 | Zenner et al. ............. 426/19 |
| 4,233,330 | 11/1980 | Zenner et al. ............. 426/321 |
| 4,291,065 | 9/1981 | Zobel et al. ............... 426/549 |
| 4,320,151 | 3/1982 | Cole ......................... 426/18 |
| 4,344,969 | 8/1982 | Youngquist et al. ....... 426/18 |
| 4,416,903 | 11/1983 | Cole ......................... 426/18 |
| 4,444,799 | 4/1984 | Vanderveer et al. ....... 426/549 |
| 4,455,333 | 6/1984 | Hong et al. ............... 426/94 |
| 4,456,625 | 6/1984 | Durst ....................... 426/106 |
| 4,503,080 | 3/1985 | Brabbs et al. ............. 426/94 |
| 4,511,318 | 4/1985 | Kolodesh et al. .......... 426/94 X |
| 4,511,585 | 4/1985 | Durst ....................... 426/106 |
| 4,584,203 | 4/1986 | DuVall et al. ............. 426/94 X |
| 4,664,921 | 5/1987 | Seiden ...................... 426/94 |

FOREIGN PATENT DOCUMENTS

| | | |
|---|---|---|
| 745082 | 7/1970 | Belgium . |
| 155203 | 9/1985 | European Pat. Off. . |
| 2603925 | 8/1977 | Fed. Rep. of Germany . |
| 58-162232 | 9/1983 | Japan . |
| 60-203134 | 10/1985 | Japan . |

OTHER PUBLICATIONS

McCullough et al., "High Fructose Corn Syrup Replacement for Sucrose in Shortened Cakes", *Journal of Food Science*, 51(2), 536–537 (1986).

Ludewig et al., "Effect of Different Sugar Types on the Production of Fine Bakery Products", *Getriede, Mehl and Brot*, 34(8), 206–215 (1980), (abstract only appearing in FSTA, vol. 15, No. 12 (1983).

*Primary Examiner*—Joseph Golian
*Attorney, Agent, or Firm*—Gretchen R. Babcock; Steven J. Goldstein; David K. Dabbiere

[57] ABSTRACT

Cookie products, having a storage-stable plurality of textures, comprising (1) discrete regions providing a stable, crisp texture; and (2) discrete regions providing a stable, chewy texture are disclosed. The regions characterized by a chewy texture include a unique saccharide mixture which comprises monosaccharides, di- and trisaccharides, a low level of tetra- and higher saccharides, and sucrose.

21 Claims, No Drawings

DUAL-TEXTURED COOKIE PRODUCTS CONTAINING A UNIQUE SACCHARIDE MIXTURE

TECHNICAL FIELD

The present invention relates to dual textured cookies containing a unique saccharide mixture.

BACKGROUND OF THE INVENTION

Fresh, home-baked cookies are the standard of excellent in the cookie world. An important feature of most fresh, home-baked cookies is their texture, specifically, a crisp, friable outside surface and a ductile interior. The inside contains pockets of super-saturated sugar solution (syrup) which are ductile and are sometimes visible as strands when the warm cookie is pulled apart. Unfortunately, within a few weeks, or less, such cookies undergo a spontaneous and irreversible process of degradation, becoming hard and crumbly throughout. The following describes the physicochemical processes which occur during cookie baking and subsequent storage.

Prior to baking, a cookie dough consists of a hydrated mixture of flour, shortening (fat), sugar, and minor adjunct ingredients. During baking, sugar and water appear to be primary interactants. The flour (starch and protein) is of less importance because it holds less water, relative to the sugar, at oven temperature.

When the cookie dough enters the oven, the water in the dough is saturated with sugar and appears to be evenly distributed throughout the dough. As the water temperature increases during baking, the solubility of the sugar increases, drawing water away from the flour. At about 70° C. all the water present has the capacity to dissolve all the sugar, as indicated by the fact that the X-ray diffraction pattern for crystalline sugar is lost. As the cookie temperature continues to increase (80° C.), a non-saturated sugar solution is formed from which the water is free to evaporate. At this point, water is rapidly lost to the atmosphere until the solution is again saturated (0.18 gram water/gram sugar). This occurs typically after about eight minutes of baking. If baking is continued, typically to the twelve minute point, the dehydration continues and a dry (0.1 gram water/gram sugar) crunchy cookie is produced, containing amorphous sugar that cannot crystallize because its water content is too low.

When a typical cookie baked eight minutes is removed from the oven (100°–105° C.), most of the water is held as the hot saturated sucrose syrup. Upon cooling, this syrup becomes super-saturated, holding the water within the cookie. It is this wet syrup that gives the cookie its fresh, chewy eating quality. During the subsequent 24 hours, the sugar begins to crystallize spontaneously, and water migrates from the interior, where the water activity is relatively high, toward the moisture-depleted outer surface. During the first one to six days after baking, moisture continues to equilibrate throughout the cookie, transferring through the starch matrix. As the water activity, ($A_w$) reaches about 0.6, the sugar is almost fully crystallized and the starch is tactilely dry. As time goes on, cross-sectional equilibrium is essentially reached. Unlike bread staling, these latter changes in a cookie cannot be reversed by heating, indicating that the starch in the cookie is not undergoing retrogradation.

It is of value, therefore, to provide cookies which, after having reached substantial textural equilibrium, still demonstrate strong texture differences between crisp regions and chewy regions. This difference should be substantial, so that it is perceivable by consumers, and storage stable, so that it is suitable for commercial production.

Currently, nearly all feasible cookie formulations which get crisp on the outside will eventually reach that same degree of crispness throughout, reverting, by water loss and sugar crystallization, to the dry, hard texture of popular ready-to-serve cookies. Most home recipe cookies will reach this totally crisp state within one or two weeks, regardless of the temperature or relative humidity at which they are stored, since the changes involved in cookie hardening are internal to the cookie and are thus independent of the cookie's external environment. Most ready-to-serve cookies are simply baked out to a crip end point immediately to facilitate subsequent handling.

Cookies can be formulated to be soft and moist by high shortening and/or high water formulas. However, such cookies have only limited microbial stability, do not stay crisp on the outside and present major problems of stickiness and crumbiness.

Another approach taken within the cookie industry has been to supply moistness impression by using coatings and/or fillings, e.g., fig bars. However, such techniques are clearly inapplicable in the case of drop-type home recipe cookies, such as chocolate chip, peanut butter, oatmeal and sugar cookies and other cookies which have a substantially homogeneous cross-section with respect to flavor and appearance.

U.S. Pat. No. 4,503,080, Brabbs and Hong, issued Mar. 5, 1985, and U.S. Pat. No. 4,455,333, Hong and Brabbs, issued June 19, 1984, describe cookies which are formed from a plurality of doughs, at least one of which contains either crystallization-resistant sugar or readily crystallizable sugar in combination with a sugar crystallization inhibitor, and at least one of which contains a conventional readily crystallizable sugar, in such a manner that the doughs remain segregated in discrete regions within the unbaked cookie. A matrix is formed which can be baked to a cookie having portions which provide a storage-stable crisp texture and portions which provide a storage-stable chewy texture.

U.S. Pat. No. 4,344,969, Youngquist et al., issued Aug. 17, 1982, describes a process for preparing cookies having storage-stable, chewy and crisp textures from a single dough wherein sugar crystallization is controlled by enzyme activity. Manipulation of water activity is one means used for activating and inactivating enzymes in selected portions of the cookie. Thus, sugars and/or starches in the areas where the enzyme is active are converted into mixtures which are non-crystallizing or crystallization-resistant, while the crystallization behavior of sucrose is preserved in those areas where the enzyme is inactive. The resulting dough and subsequent crumb areas of the baked cookie have storage-stable, chewy and crip textures, respectively.

In contrast, the present invention provides storage stable dual-textured cookies which have a sweetness profile which more closely resembles that of freshly-baked cookies.

Changing the sugar component of baked goods from the commonly used sucrose to other sugars or combinations of sugars to preserve the fresh flavor and texture of the goods is known. See, for example, "High Fructose Corn Syrup Replacement for Sucrose in Shortened Cakes", *Journal of Food Science*, Vol. 51, No. 2, (1986), pp. 536-37, which discloses replacement of sucrose with high fructose corn syrup to achieve moister cakes.

The use of fructose, present in invert sugars and honey, in the making of cookies is widely known among those with cooking and baking experience. In addition, fructose nominally is about 1.4 times as sweet as sucrose, and has therefore been incorporated in so-called "dietetic" baking recipes. See, for example, U.S. Pat. No. 4,137,336, S. B. Radlove, issued Jan. 30, 1979.

U.S. Pat. No. 4,233,330, Zenner, issued Nov. 11, 1980, discloses replacing 10-35% of the sugar and fat content of cake products with lactose to prolong the shelf life of the product. However, lactose is not well tolerated by many adults and is therefore not desirable in products of this type. U.S. Pat. No. 4,291,065, Zobel, issued Sept. 22, 1981, discloses a method for controlling the staling of sweet baked goods by replacing 30-100% of the sweetner composition with oligosaccharides having two or three saccharide units. This alteration may have an undesirable effect on the texture of the baked product, making it more gummy and sticky.

It has now been discovered that by making cookies from a plurality of doughs, one containing a conventional readily crystallizable sugar, and another a unique saccharide mixture which comprises monosaccharides, di- and trisaccharides, a low level of tetra- and higher saccharides, and sucrose, in such a manner that the two doughs remain segregated in discrete regions within the unbaked cookie, a matrix is formed which can be baked to a cookie having portions which provide a crisp texture and portions which provide a chewy texture.

By the practice of this invention, a texture profile is provided which is stable to aging, under normal packaging and storage conditions, and very closely approximates the organoleptic properties of a freshly baked homemade cookie. Properly executed, these cookies can be made to give the appearance of a conventional homogenous system, with little or no visual evidence of a multi-part structure.

Furthermore, by the practice of this invention, a sweetness profile is provided which very closely approximates the sweetness properties of a freshly baked home-made cookie.

It is therefore an object of this invention to provide a crumb-continuous dual-textured cookie having an improved sweetness profile, mouthmelt and dissipation, and extended shelf stability.

SUMMARY OF THE INVENTION

Crumb-continuous cookie products having distributed therein discrete regions of storage-stable crisp texture and discrete regions of storage-stable chewy texture are claimed. These products contain in the dough of the chewy interior region of the cookie from about 20 to about 60% of a unique saccharide mixture This saccharide mixture comprises, by weight of said saccharide mixture:
(1) from about 25 to about 60% monosaccharides, selected from the group consisting of glucose, fructose, and mixtures thereof;
(2) from about 10 to about 50% glucose-based di- and trisaccharides selected from the group consisting of maltose, isomaltose, maltotriose and other isomers of glucose-based trisaccharides, and mixtures thereof;
(3) from about 4 to about 9% glucose-based tetra- and higher saccharides; and
(4) from about 15 to about 60% sucrose.

DETAILED DESCRIPTION OF THE INVENTION

The present invention provides an improved sweetened food product in the form of a cookie dough preform, or the like, which, when baked, provides a storage-stable plurality of textures, the cookies made therefrom, and a method for generating the plurality of textures through inhibition of sugar crystallization.

The unbaked product comprises a matrix made from cookie ingredients, and is characterized by having distributed therein disrete regions of dough containing readily crystallization sugar, and discrete regions of dough containing from about 20 to about 60% of an uncrystallizable saccharide mixture, which comprises, by weight of said saccharide mixture:
(1) from about 25 to about 60% monosaccharides selected from the group consisting of glucose, fructose, and mixtures thereof;
(2) from about 10 to about 50% glucose-based di- and trisaccharides selected from the group consisting of maltose, isomaltose, maltotriose and other isomers of glucose-based trisaccharides, and mixtures thereof;
(3) from about 4 to about 9% glucose-based tetra- and higher saccharides; and
(4) from about 15 to about 60% sucrose;
whereby the product, when baked, provides a cookie having a storage-stable plurality of textures.

The dough products of this invention can be packaged and stored, preferably refrigerated or frozen, for baking by the consumer. Such dough products, when baked, produce cookies which, after equilibration, retain a plurality of textures over long periods of time, when stored in sealed containers. The dough products of this invention also can be baked into cookies by the manufacturer. The cookies, when packaged in relatively air- and moisture-tight containers, provide the plurality of textures they had when freshly baked, for periods of up to several months, and longer.

The improved cookie products of this invention comprise a crumb-continuous matrix of the type described in U.S. Pat. No. 4,503,080, Brabbs et al., issued Mar. 5, 1985, and U.S. Pat. No. 4,455,333 Hong et al., issued Jun. 19, 1984, both incorporated by reference herein, made from cookie ingredients, and have distributed therein discrete regions of crumb containing readily crystallizable sugar and discrete regions of crumb containing the uncrystallizable saccharide mixture as described above, whereby the product provides a storage-stable plurality of textures: the regions containing crystallized sugar providing a crisp texture and the regions containing the uncrystallized saccharide mixture providing a chewy texture.

The cookies of this invention are of the "crumb-continuous" type which typically have a relatively uniform distribution of the crumb ingredients throughout the cookie, e.g. oatmeal cookies, chocolate chip or Toll House ™ cookies, peanut butter cookies, sugar cookies, and other drop-type cookies. This is in distinction to the filled, coated, and sandwich-type cookies known to the art.

By "storage-stable" is meant that the cookies produced by the practice of this invention, after reaching substantial textural equilibrium, retain a plurality of textures for extended periods. Depending upon their formulations, cookies prepared by the practice of this invention will, after equilibration, retain their original texture for periods ranging from weeks, at a minimum, to many months, or even indefinitely, with proper packaging and maintenance of package integrity.

By "substantial textural equilibrium" is meant the point at which those physico-chemical and structural features responsible for texture, and those physico-chemical and structural processes responsible for changes in texture have reached an approximately steady state relative to the expected usable life and storage conditions of the product. The process by which this is attained is tempering. This is done by holding the cookies at ambient conditions (e.g., 70° F.) until textural equilibrium is obtained.

By "cookie ingredients" is meant those ingredients commonly used in cookies, namely, sugar, flour, water, and shortening, as well as those additional flavoring and texturing ingredients desired in the particular system being formulated. Such latter ingredients would include nutmeats, cereals, raisins, and chocolate chips, as well as egg, vanilla, cinnamon, cocoa, and the numerous other similar materials commonly found in cookies, as desired.

The term "water activity" ($A_w$) is used herein in its usual context to mean the ratio of the fugacity of water in the system being studied (f) to the fugacity of pure water ($F_o$) at the same temperature. The water activity of the products and compositions herein can be measured using well-known physical chemical techniques and commercially available instruments.

By "readily crystallizable sugar" is meant a mono- or disaccharide, or mixture of mono- and/or disaccharides, that readily and spontaneously crystallizes at the water content and water activity conditions encountered in semi-moist cookies of the home-baked type. Sucrose is virtually unique among the readily available food sugars in this regard.

By "double chocolate chip cookie" is meant a cookie which contains both cocoa as a dough ingredient, and chocolate chips (Toll House TM morsels, or the like).

The term "matrix" is used herein to indicate that the ingredients in a typical cookie formulation are not all mutually soluble, so that, while the cookie dough and/or crumb portion may appear relatively homogeneous macroscopically, at the microscopic level specific starch granules, pockets of syrup, crystals of sugar, oil droplets, inclusions, etc., can be identified.

By "baking" herein is meant radiant, conductive, or convective exposure to energy of a type which imparts thermal energy to the product being baked. It thus includes conventional, convection, dielectric and microwave oven baking.

The term "laminated" is used herein to indicate discrete regions of one or more textures in a baked product, specifically discrete regions of crisp and chewy textures. It includes but is not limited to superimposed layers of one or more materials.

The term "chewy dough" is used to denote a dough that will have a chewy texture after baking and equilibrating.

The term "crisp dough" is used to denote a dough that will have a crisp texture after baking and equilibrating.

By "shortening" is meant an edible triglyceride fat-based compound suitable for cooking or baking. Although a suitable emulsifier may be included in the products of the present invention, the term "shortening" as used herein does not include an emulsifier.

The present invention provides a dough-based, ready-to-bake sweetened food product which, when baked, has a substantially homogeneous cross-section with respect to flavor and appearance and a shelf-stable cross-sectional texture variability typical of freshly baked cookies, and the cookies made therefrom. This invention further provides a process for inhibiting crystallization of the sweetener component by utilization of a unique sweetening component containing a blend of different saccharides contained in a dough-based food product.

The dough product of the present invention is made by preparing a first cookie dough from typical cookie ingredients but where the sweetening component consists of from about 20 to about 60% of a non-crystallizing saccharide mixture, which comprises, by weight of said saccharide mixture:

(1) from about 25 to about 60% monosaccharides selected from the group consisting of glucose, fructose, and mixtures thereof;

(2) from about 10 to about 50% glucose-based di- and trisaccharides selected from the group consisting of maltose, isomaltose, maltotriose and other isomers of glucose-based trisaccharides, and mixtures thereof;

(3) from about 4 to about 9% glucose-based tetra- and higher saccharides; and (4) from about 15 to about 60% sucrose; and preparing a second cookie dough, containing sucrose or a solution thereof, and substantially enveloping said first dough with a layer of said second dough, thereby forming a ready-to-bake, laminated dough structure, which is then baked to yield an improved dual textured cookie.

Laminated dough structures can be made according to the foregoing process, wherein one or both doughs further comprise a member selected from the group consisting of cereals, nutmeats, peanut butter, cocoa, raisins, chocolate chips, and butterscotch chips, and mixtures thereof. Nutmeats include the whole or chopped meat of any edible nut, including walnuts, black walnuts, hickory nuts, hazel nuts, brazil nuts, peanuts, macadamia nuts, pecans, almonds, cashews, and the like. Another nutmeat especially suitable for use in cookies is coconut.

The first cookie dough, used in making laminated dough structures, which has a chewy texture after baking, includes from about 20 to about 60% of a unique saccharide mixture. More specially, this saccharide mixture is comprised, by weight of said saccharide mixture, of from about 25 to about 60% monosaccharides selected from the group consisting of glucose, fructose, and mixtures thereof; from about 10 to about 50% glucose-based di- and trisaccharides selected from the group consisting of maltose, isomaltose, maltotriose and other isomers of glucose-based trisaccharides, and mixtures thereof (these other isomers are those naturally occurring isomers which result from the acid or enzymatic hydrolysis of starch, especially corn starch); from about 4 to about 9% of glucose-based tetra- and higher saccharides; and from about 15 to about 60% of sucrose.

The simplest of the saccharides in the saccharide mixture are monosaccharides. Examples of monosaccharides are glucose and fructose. These monosaccharides are present in the saccharide mixture of the present invention at a total level of from about 25 to about 60%, preferably from about 30 to about 50%. Fructose is approximately 1.4 times as sweet as sucrose.

The saccharide mixture also comprises from about 10 to about 50%, preferably from about 10 to about 40%, of glucose-based disaccharides, trisaccharides, or mixtures thereof. These are sugars which consist of two and three glucose units, respectively, joined by a glycosidic linkage. The glucose-based disaccharides employed in the present invention are maltose, isomaltose and mixtures thereof. The glucose-based trisaccharides which provide the best results in the present invention are maltotriose, other isomers of glucose-based trisaccharides, and mixtures thereof. These di- and trisaccharides reduce the sweetness of this sugar system since they are about half as sweet as sucrose.

The saccharide mixture also comprises from about 4 to about 9%, preferably from about 5 to about 7%, of glucose-based tetrasaccharides and saccharides with even higher degrees of polymerization. One example of such a saccharide is maltotetrose. These saccharides are even less sweet than the di- and tri-saccharides.

Finally, the saccharide mixture comprises from about 15 to about 60%, and preferably from about 30 to about 55% of sucrose, which is the predominant sweetener found in most conventional baked goods. This saccharide provides to the product the desirable sweetness intensity and sweetness profile characteristic of traditionally home-baked goods.

Baked goods made with sucrose as the predominant sweetener are very desirable when freshly baked. This saccharide provides the well-known sweetness intensity and sweetness profile to baked goods. However, use of this saccharide in baked goods leads to sucrose crystallization. Thus, products baked with sucrose lose their fresh baked texture after a relatively short period of time. The resulting product has a firm, but brittle and crumbly texture.

The present invention provides a means for providing the sweetness intensity and sweetness profile of traditional fresh-baked cookies. At the same time, the present invention provides a means for inhibition of crystallization in baked cookies over an extended shelf-life. This is done with the unique mixture of saccharides as outlined above.

The saccharide mixture of the present system can be formulated from the individually named sugars. However, since some of the saccharides are not readily available and some of those that are available are costly, the saccharide mixture is preferably obtained by blending together corn syrups and sucrose. Corn syrups are products resulting from the hydrolytic action of either acid, enzyme or a combination of both, on starch slurries. In this process, starch is converted into a mixture of mono-, di-, tri-, tetra- and higher saccharides. It is the relative proportions in which these various saccharides are present that give each type of corn syrup its special characteristics. High fructose corn syrup can alternatively be prepared by introducing isomerase enzymes into glucose, thereby converting all or part of it into fructose.

Preferably, a saccharide mixture with the levels of mono-, di-, tri-, and higher saccharides of the present invention may be prepared by combining particular amounts of a high fructose corn syrup, a high maltose corn syrup or conventional corn syrup and sucrose. Suitable high fructose corn syrups useful herein contain either about 42% fructose, about 55% fructose, or about 90% fructose on a sugar solids basis. Suitable high maltose corn syrups and certain conventional syrups contain from about 30 to about 75% combined maltose, isomaltose, maltotriose and isomers of glucose-based trisaccharides, on a sugar solids basis. Examples of suitable commercially-available high maltose corn syrups are Neto ® 7300 and 7350, available from A. E. Staley Manufacturing Company. Examples of suitable commercially-available corn syrups are Amaizo ® DE54 and DE62, available from American Maize Products Company. An example of a high fructose corn syrup is Isosweet 100 ®, available from A. E. Staley Manufacturing Company, which contains about 42% fructose.

Saccharide mixtures of the present invention can typically be prepared from blends of from about 30 to about 35% of high fructose corn syrup, from about 20 to about 25% high maltose corn syrup, and about 40 to about 50% sucrose on a sugar solids basis. For example, about 22% of high maltose Neto ® 7350 combined with about 33% of high fructose Isosweet 100 ®, and about 45% of dry granulated sucrose would give a saccharide mixture that consists of about 14% frucrose, about 19% glucose, about 11% maltose, about 45% sucrose, about 5% maltotriose and about 6% tetra- and higher saccharides.

The saccharide mixture of the present invention can also be produced by introducing enzymes (invertase) into a sucrose solution and allowing the mixture to stand until a desired amount of fructose and glucose is formed. Additionally, the enzymes can be mixed in a sucrose-containing dough. This latter procedure is described in U.S. Pat. No. 4,344,969, Youngquist et al., issued Aug. 17, 1982, which is incorporated by reference herein. This combination of sucrose, fructose and glucose can then be mixed with an appropriate amount of high maltose corn syrup to form the saccharide mixture. In addition, the sucrose-high fructose/glucose solution could be blended with a mixture of starch and enzymes (amylase-type) that has had sufficient standing time to convert to high maltose corn syrup. Additionally, the enzymes can be mixed in a suitable starch-containing dough.

The saccharide mixture can also be prepared from the individually named sugars using the following combination: from about 25 to about 50% of a combination of dry fructose and dry glucose, from about 15 to about 60% of dry sucrose, from about 10 to about 40% dry maltose and/or maltotriose, and from about 5 to about 7% dry corn syrup solids of tetra- and higher saccharides. For example, a combination of about 19% dry glucose, available from A. E. Staley Manufacturing Company, about 14% crystalline fructose, available from Suddentsche Zucker-Aktiengesellschaft Mannheim, about 50% dry sucrose, available from Colonial Sugar Company, about 10% maltose monohydrate, available from Sigma Chemical Company, and about 8% Maltrin M205 ®, available from Grain Processing Company, would be suitable.

This unique saccharide mixture, regardless of how it is prepared, provides the desirable sweetness intensity profile to the chewy inner dough component of the cookie and cookie dough products of the present invention. The sweetness profile, in particular, is characteristic of that found in home baked cookies. Furthermore, the saccharide mixture of this invention does not crystallize as the traditionally used sucrose in cookies does. Thus, the invention disclosed herein also provides a method of inhibiting the crystallization of the sweetener component in a sweetened crumb-structured food product, such as a cookie.

The sugar component of the second cookie dough used in making a laminated dough structure which has a crisp texture after baking, consists essentially of a readily crystallizable sugar, preferably sucrose or a solution thereof. Readily crystallizable sugars include sucrose and mixtures of sucrose and other mono-and disaccharides which comprise at least 75%, preferably at least 80%, most preferably at least 85%, sucrose by weight.

Flour contributes the starch component to the baked products of the present invention (since the major component of most flours is starch). The flour may be any finely comminuted meal from any cereal grain or edible seed, or mixtures thereof, as are known by one skilled in the art of baking. Typical non-limiting examples are wheat flour, barley flour, rye flour, cornstarch and corn flour, triticale, and also the so-called synthetic flours, which incorporate such materials as starch and soy protein isolate, with or without heat and/or steam treatment. These are more fully discussed, generally, in Pomeranz, *Wheat Chemistry and Technology*, Second Edition, 1971, which is hereby incorporated by reference. Typically, from about 10% to about 50% of each of the doughs used herein is comprised of flour. The wheat flours are most typically employed in baking. They consist of several types including hard red spring, hard red winter, soft red winter and white winter and spring. They are distinguished by differences in gluten quality, water absorption and protein content. Protein in these various flours can vary from about 7% to about 14%, with the soft wheat flours having protein contents at the lower end of that range and the hard winter wheat flours having protein contents at the upper end of that range. Isolate starch is another source of the starch component for these baked products. Isolate starch contains substantially no protein.

The amount of protein in a baked good influences its texture and tenderness. The primary source for protein in baking is egg. However, since flour also contains some protein, the type of flour used in baking can influence the final product's texture somewhat. The higher the protein content in a flour the tougher texture a product baked with that flour will have.

The level of starch in the present invention is from about 15 to about 35%.

The shortening component of the doughs of the cookies of the present invention is obtained by the process of hydrogenating a vegetable oil, a marine oil, an animal fat, or blends thereof. Preferably, the oil is a vegetable oil having fatty acid chains containing from about 14 to about 20 carbon atoms. Oils useful in the present invention include soybean, sunflowerseed, safflower, corn, Canola, palm, palm oil olein, coconut, palm kernel, peanut, olive, and cottonseed oil. Preferred oils include soybean, sunflowerseed, cottonseed, safflower, palm, corn, and Canola oil. The most preferred oils are soybean, cottonseed, and palm oil. Preferred animal fats include tallow olein and fractionated or modified lard. Corn, palm, and cottonseed oil will form an acceptable shortening when hydrogenated alone. The oils may be blended either prior to or following hydrogenation. A preferred blend is soybean and cottonseed oil.

In order to keep the fat solids content of the cookie products of this invention at a minimum, a particular shortening system is useful. This system consists of two separate shortenings, each having a unique solids content index (SCI) profile and a very low level of body temperature solids. Such a shortening system is disclosed in U.S. Pat. No. 4,664,921, Seiden, issued May 12, 1987, which is incorporated by reference herein.

This preferred shortening system would be incorporated into the cookies of the present invention as follows: The dough having readily crystallizable sugar would contain from about 10% to about 30% of a shortening having an SCI at 21° C. of from about 14.0 to about 20.0 and an SCI at 33° C. of from about 0.0 to about 8.0 and the dough containing the crystallization-resistant saccharide mixture would contain from about 10% to about 30% of a shortening having an SCI at 21° C. of from about 12.0 to about 18.0 and an SCI at 33° C. of below about 2.0. After hydrogenating a suitable oil to prepare the shortenings, the SCI profile is further adjusted by blending up to 45% partially hydrogenated soybean oil or other oil low in fat solids content into the shortening. If beta-prime stability is desired, this can be attained by incorporating from about 2% to about 80% of a highly beta-prime stable oil, or oil blend, such as hydrogenated cottonseed and/or palm oils or palm oil olein into the shortening formulation.

The use of beta-prime stable shortening for cookies, while not essential to the production of an acceptable cookie, is greatly preferred. The preferred method of attaining beta-prime stability is to blend from about 50% to about 90% of a vegetable oil such as soybean, sunflowerseed, or safflower oil with from about 10% to about 50% of a highly beta-prime stable base fat, such as partially hydrogenated cottonseed, palm oil, and/or plam oil olein.

Use of this preferred shortening system in a dual-textured crumb-continuous cookie results in an optimum mouthmelt and dissipation, flavor display, dough stability, and flavor and oxidative stability.

Preferably, fresh whole eggs are used in making the baked products of the present invention. Egg imparts flavor, richness and color to the baked goods. On the average, an egg contains about 73% water and about 27% egg solids. The egg solids comprise about 48% protein, about 44% fat, and about 8% minor materials. Alternatively, egg solids, particularly egg albumen and dried yolk, may be used in baking the products disclosed herein. Soy isolates, whey protein concentrates, or other egg substitutes may also be used herein in combination with, or in place of the egg solids. Such substitutes are well known by one skilled in the art of baking. From 0 to about 6%, preferably about 0.1% to about 6%, (on a dry solids basis) of the baked products of the present invention should comprise egg or egg substitute.

Chemical leavening agents can also be added to the compositions of the present invention to provide aeration to the final product. Examples include a baking soda, e.g. sodium, potassium, or ammonium bicarbonate, and/or a baking acid, preferably sodium aluminum phosphate, monocalcium phosphate, dicalcium phosphate or mixtures thereof. The selection of the leavening system is within the skill of one in the art. From 0 to about 2%, preferably from about 0.1 to about 2%, of the baked products of the present invention will typically be leavening agent.

Additional components can be added to the batter or dough of the present invention prior to baking to provide a wide variety of cookie varieties. Additives may be of a type that remain as whole pieces in the product. Such additives include but are not limited to, chocolate, peanut butter or butterscotch chips or chunks; fruit or fruit-flavored bits, such as blueberry, strawberry, or citrus flavored bits as disclosed in U.S. Pat. No. 3,794,741, Weigle, issued Feb. 26, 1974, which is herein incorporated by reference; other fruit flavored bits such as cherry, blackberry, apricot, raisin, date, or apple; cereals, such as bran or oatmeal; and nutmeats including the whole or chopped meat of any edible nut including walnuts, black walnuts, hickory nuts, hazel nuts, brazil nuts, peanuts, macadamia nuts, pecans, almonds, cashews, coconut and the like. From 0 up to about 40% of the final baked product of the present invention can be such additives.

Other components of a type that are blended into the dough or batter prior to baking may be incorporated to add flavor, aroma, and color to the final baked product. For example, peanut butter; spices, such as cinnamon, mace, nutmeg, caraway, anise, allspice, poppy seed, coriander, ginger, cloves, fennel, and salt; and flavorings, such as banana, orange, lemon, mint or vanilla. Honey or molasses may also be used in the present invention, but the levels of the individual sugars in the saccharide mixture must be altered to account for the sugars in the honey or molasses. Mixtures of these flavorings and whole piece components can be added to provide a variety of desirable products. From 0 up to about 10% of the final baked product of the present invention can be comprised of such flavoring additives. The exact amount added for any of these flavoring components (whether they are of the type that is blended into the composition or the type that remain as whole pieces) will depend on personal preference and on what particularly is being added.

For a chocolate snack product, cocoa is incorporated into the dough or batter prior to baking. The cocoa used in this invention can be processed from either natural or "Dutched" chocolate from which a substantial portion of the fat or cocoa butter has been expressed or removed by solvent extraction, by pressing, or by other means known to those skilled in the art. Cocoa suitable for use in the practice of this invention may contain from about 1% to about 30% fatty constituents.

Dutched chocolate is prepared by treating cocoa nibs with an alkali material such as potassium carbonate in a manner well known in the art. Generally, it tends to have a darker color and also can be more flavorful than natural cocoas.

Chocolate can be used in practicing the present invention and it is intended, therefore, that chocolate, as described above, is to be encompassed by the term "cocoa." When chocolate is used, it should be in a finely divided form. It may be necessary to reduce the amount of shortening in the mix when chocolate is used because of the additional fat present as cocoa butter. It may also be necessary to add larger amounts of chocolate as compared to cocoa in order to provide equivalent flavoring and coloring.

Preferably, the cookies and doughs of the present invention contain a suitable emulsifier system. A preferred emulsifier system is described in U.S. Pat. No. 4,680,184 of Seiden et al, issued July 14, 1982, incorporated by reference herein.

The most preferred emulsifier system is a multi-component emulsifier system comprising:

(a) from about 40% to about 100% (by weight based on the monoglyceride content) fatty acid mono-diglycerides having from about 35% to about 99% fatty acid monoglycerides, and from about 1% to about 50% fatty acid diglycerides, wherein at least about 65% of said fatty acids are selected from the group consisting of $C_{14}$–$C_{18}$ saturated fatty acids and $C_{16}$–$C_{20}$ trans-unsaturated fatty acids and mixtures thereof;

(b) from about 0% to about 60% (by weight) fatty acid esters of sucrose or polyglycerol having from 4 to 14 hydroxyl groups, wherein from about 10% to about 66% of the hydroxyl groups are esterified, and wherein at least about 65% of said fatty acids are selected from the group consisting of $C_{14}$–$C_{20}$ saturated fatty acids and $C_{16}$–$C_{20}$ trans-unsaturated fatty acids and mixtures thereof; and (c) from about 0% to about 60% (by weight) of fatty acid monoglyceride esters of polycarboxylic acids and their derivatives, wherein at least about 65% of said fatty acids are selected from the group consisting of $C_{14}$–$C_{20}$ saturated fatty acids.

The baked food products of the present invention, i.e., cookies, are made by a process described hereinabove, which process further comprises the step of baking the laminated dough structure, preferably to a final water activity, ($A_w$), of from about 0.35 to about 0.6, most preferably from about 0.4 to about 0.55. While not intended to be limited by past practice, cookie baking times typically range from about five minutes to about fifteen minutes, depending on the number of cookies being baked, the size and shape of the cookie, the cookie ingredients, oven temperature, and like factors. The baking process is straightforward, no modifications being needed for the practice of this invention. Baking can either be performed in the batch mode, as is typically done in the home, or in continuous fashion, as is often done in commercial bakeries.

A variety of cookies can be produced by the foregoing process, depending, of course, upon the adjunct ingredients used in preparing the doughs, including sugar cookies, oatmeal cookies, peanut butter cookies, chocolate chip cookies, and double chocolate chip cookies.

While the foregoing illustrates one preferred mode of practicing the present invention other, potentially less preferable, embodiments can also be practiced.

In some cookie formulations, depending upon the baking processes employed, it may not be necessary to cover the entire surface of the non-crystallizable saccharide mixture-containing dough with the readily crystallizable sugar-containing dough. For example, the bottom surfaces of cookies baked on metal cookie sheets are heated directly by conduction through a medium which has a high heat conductivity, while the remainder of such cookies are heated via the less efficient processes of radiation and convection. Thus, the bottom surface of dough which is baked on a metal baking sheet will be crisper, when the cookie is removed from the oven, than the remainder of the cookie, even if the dough contains the non-crystallizable saccharide mixture. Accordingly, the present invention also provides a ready-to-bake sweetened food product, which, when baked, has a substantially homogeneous cross-section with respect to flavor and appearance and a shelf-stable cross-sectional texture variability typical of freshly baked cookies, comprising a discrete body of a first cookie dough which comprises a non-crystallizing saccharide mixture and flour and shortening, and a lamina of a second cookie dough superposed on at least a portion of the surface of said first cookie dough, said second cookie dough comprising sucrose and flour and shortening, thereby forming a laminated dough structure.

It can also be appreciated that the present invention offers the opportunity to make entirely crumb-continuous cookies which provide the crisp exterior/chewy interior typical of home-style cookies, but in which various regions differ substantially in flavor and/or appearance. For example, a chocolate flavored crisp dough can be laminated onto a peanut butter flavored chewy dough to produce a "peanut butter cup" cookie. Such cookies are also encompassed by the present invention.

Laminated dough structures may be formed by a variety of techniques, such as by applying a layer of crisp cookie dough to only the top part of a mass of chewy cookie dough; by embedding particles or granules of crisp cookie dough in a body of chewy cookie dough, or vice versa; by winding or otherwise distributing strands of extruded crisp cookie dough upon the surface of a ball of chewy cookie dough; by laminating alternating sheets of crisp and chewy doughs and rolling and slicing to form a "pinewheel" structure; and a variety of other techniques well within the grasp of those in the food production art.

Of course, it will be recognized that the cookies of this invention can be used as the biscuit or crumb portion of a sandwich or filled cookie. The biscuit areas will maintain their textural diversity when incorporated into these structures.

It can also be appreciated that each of the processes disclosed herein for making the products of this invention, while described in some cases as being performed by hand, can be adapted to high speed automation. Examples of applicable techniques include those used for making ravioli, fig bars, and filled candies.

Sugar, flour, water and shortening, when combined in almost any reasonable proportions, will produce a dough that can be baked to form a cookie—the classic "sugar cookie". Of course, the sweetness, texture and similar organoleptic properties of the cookie will depend upon the ratio of sugar/flour/water/shortening. In general, any cookie recipe which produces an organoleptically acceptable crumb-continuous cookie (as opposed to filled, iced and sandwich-type cookies) can be employed in the practice of the present invention. Some such recipes will incorporate additional ingredients. For example, oatmeal cookies generally contain rolled oats to provide their characteristic flavor and texture. Peanut butter cookies will, of course, contain peanut butter, which provides not only the distinctive flavor of peanut butter, but also oils (shortening) and peanut solids which supply both carbohydrates and proteins, similar to flour. Within limits, well known in the art, materials which "interrupt" the homogeneous composition of the typical cookie can be introduced into the formualation. These materials are essentially inert, so far as the chemistry of the cookie dough is concerned. Examples of such materials, referred to hereinafter as "inclusions", are chopped nuts, chocolate chips or Toll House TM morsels, coconut, butterscotch chips, oatmeal, peanut butter chips, raisins, and the like. Even in simple cookies, such as sugar cookies, it may be desirable to incorporate additional flavoring materials, such as spices.

The ratio (w/w) of chewy dough to crisp dough (exclusive of discrete additives) is important in producing an appropriate textural cross section in the finished cookie. For example, the typical home-baked cookie currently made can be considered a 0:1 ratio chewy dough:crisp dough cookie, and after aging is undesirably hard and crumbly throughout. On the other hand, a cookie made entirely from dough containing the noncrystallizing saccharide mixture throughout could be characterized as a 1:0 chewy dough:crisp dough cookie, which lacks the desirable surface crispness of the typical home-baked cookie. The laminated dough structures of the present invention are generally made to contain from about 0.2:1 chewy dough:crisp dough to about 5:1 chewy dough:crisp dough, preferably from about 0.7:1 to about 2:1. At ratios of less than 0.2:1, the water-starved crisp dough tends to rob moisture from the chewy dough, degrading its normally chewy eating texture. Conversely, at ratios greater than about 5:1, the regions of crisp dough must be made very small in comparison to the relatively large volume of chewy dough, and thus become difficult to work with. In addition, since the doughs have limited structural integrity, it is very likely that the chewy dough will break through the thin crisp dough as the laminated dough structure softens during baking, and discrete regions of dough will not be maintained. Most preferred from the standpoint of product texture and ease of manufacture, is a chewy dough:crisp dough ratio of about 1.3:1.

Both the chewy dough and crisp dough employed in producing the laminated dough structures of the present invention are amenable to the sort of formula modifications commonly employed in the baking art. In particular, in the practice of the present invention, it is desirable to incorporate such materials as dough conditioners into the crisp dough to reduce crumbliness and improve browning characteristics. Two additives, fructose and the calcium salt of stearoyl 2-lactylate, appear to improve crumbliness in aged cookies of this invention. These are incorporated in the crisp dough in minor proportions, generally less than about 5% fructose (total sugar weight basis) and/or less than about 5% calcium stearoyl 2-lactylate (fat weight basis, which equals about 1.2% by weight of the total dough system). The fructose level in the crisp dough must be kept sufficiently low that the sucrose in the crisp dough remains readily crystallizable. Most preferred is about 2% fructose (sugar basis). A suitable antioxidant can also be incorporated into the dough formulas to aid in preserving the baked product.

Handling and baking characteristics of the crisp dough can also be improved substantially by the use of somewhat higher flour levels.

In addition, the laminated dough structure system offers the opportunity for further formula modifications which enhance the cross-sectional texture variability of the cookie. For example, an inner, chewy dough can be formulated to be much shorter than an outer, crisp dough, or with shortening having a lower melting point than that of the crisp dough. Such chewy doughs would normally bake into unacceptable cookies because of their relatively thin consistency and consequent lack of structural integrity during baking. When baked, they would spread or run undesirably, becoming unacceptably browned and crisp as a result. However, such doughs, when used as the chewy dough of a laminated dough structure, can easily be baked, because the outer, crisp dough acts as a container or shell for the chewy dough during the early part of the baking process. Toward the end of the baking process, the shell of outer dough collapses around the inner, chewy dough to form a familiar cookies of apparent unitary structure and composition, but in which the center is exceptionally rich and chewy.

The following examples illustrate the broad applicability of the present invention. It will be appreciated that other modifications of the present invention, within the skill of those in the baking arts, can be undertaken without departing from the spirit and scope of this invention.

All percentages herein are by weight, unless otherwise indicated.

EXAMPLE I

| Ingredient | Weight (grams) |
|---|---|
| Crisp Outer Dough | |
| Shortening ("Crisco" brand, The Procter & Gamble Company) | 150.0 |
| Granulated Sucrose ("Kroger" brand) | 112.5 |
| Brown Sugar ("Kroger" brand) | 112.5 |
| Fresh Egg Yolk | 27.0 |
| Dry Egg White Solids | 4.5 |
| Vanilla Flavoring | 3.0 |
| Distilled $H_2O$ | 40.5 |
| All Purpose Flour | 186.0 |
| Salt | 3.0 |
| Baking Soda | 3.0 |
| Total | 642.00 |
| Chewy Inner Dough | |
| Shortening 1 Hydrogenated soybean oil (54 g) Hydrogenated cottonseed oil (3.0 g) Slightly hydrogenated soybean oil (having an IV of from about 105 to about 110) (43 g) | 100.0 |
| Granulated Sucrose ("Kroger" brand) | 67.5 |
| Isosweet 100 ® Corn Syrup (A. E. Staley Co.) | 48.7 |
| DE 62 ® Corn Syrup (American Amaizo) | 54.87 |
| Fresh Egg Yolk | 18.0 |
| Dry Egg White Solids | 3.0 |
| Vanilla Flavoring | 2.0 |
| Distilled $H_2O$ | 5.92 |
| All Purpose Flour | 116.18 |
| Starch (Pregelatinized Waxy Maize Starch from American Maizo Corp.) | 7.82 |
| Salt | 2.0 |
| Baking Soda | 2.0 |
| Total | 427.99 |

The dough for the crips outer layer of cookie is first prepared by combining the shortening, granulated sucrose and brown sugar in a bowl with a "Sunbeam" brand mixer at speed #1. The fresh egg yolk, dry egg white solids, vanilla flavoring, and water are then added and the mixture is blended. The flour, salt and baking soda are then added and mixed until moistened. For each cookie, a top portion is formed by pressing 2.67 grams of cookie dough to a desired diameter of approximately 1.88 inches (4.8 cm). A bottom portion is formed by rolling 2.01 grams of cookie dough to a desired diameter of approximately 1.6 inches (4 cm).

The dough for the chewy inner layer of cookie is prepared by first combining the shortening (prepared by hydrogenating the soybean oil to an IV of 83 and the cottonseed oil to an IV of 61, blending the two oils then adding the hydrogenated soybean oil) and granulated sucrose in a mixer bowl and blending with a "Sunbeam" mixer at speed #1. The corn syrups, egg yolk, dry egg white solids, vanilla flavoring, and distilled water are added to the mixer bowl and blended until combined. The flour, starch, salt and baking soda are added to the mixer bowl and mixed until moistened. For each cookie, 6.24 grams of dough is mixed with 2.08 grams of "Nestle" brand chocolate chips and formed into a ball. This ball of inner dough is placed on top of the 4 cm disc of outer dough. The 4.8 cm disc of outer dough is then placed over the ball of inner dough. The edges of the two discs of outer dough are then crimped to seal the inner dough within. The laminated dough pieces are then hand rolled to a hemispherical shape to form dough preforms. The dough preforms are then placed on a cookie sheet. The water activity of the inner cookie dough prior to baking is 0.73, the water activity of the outer dough is 0.80. The formed cookies are baked at 375° F. in a conventional General Electric deck oven for 7¼ minutes.

The baked cookies have a water activity of 0.41 as measured 24 hours after baking. The total saccharide content of the chewy portion of the baked cookie is about 37%. Of this amount, about 35% is comprised of monosaccharides, about 14% is comprised of di- and trisaccharides, about 6% is comprised of higher saccharides, and about 45% is comprised of sucrose. The cookies have a soft chewy texture on the inside and a crispy texture on the outside. This textural dichotomy is retained over an extended shelf life of one year or more. The sweetness intensity profile of the chewy inner portion of the baked cookie is surprisingly like that of a freshly made home-baked cookie. The chewy inner portion of this cookie is also resistant to sugar crystallization staling over an extended shelf life.

Substantially similar results are obtained if the flour of this example is replaced in part with a synthetic flour, triticale, oat flour or corn flour.

EXAMPLE II

| Ingredient | Weight (grams) |
|---|---|
| Crisp Outer Dough | |
| (Same as Example 1) | |
| Chewy Inner Dough | |
| Shortening (Of Example 1) | 100.0 |
| Granulated Sucrose ("Kroger" brand) | 67.5 |
| Isosweet 100 ® Corn Syrup (A.E. Staley) | 58.4 |
| Neto 7350 ® Corn Syrup (A.E. Staley) | 45.18 |
| Fresh Egg Yolk | 18.0 |
| Dry Egg White Solids | 3.0 |
| Vanilla Flavoring | 2.0 |
| Distilled $H_2O$ | 5.89 |
| All Purpose Flour | 116.18 |
| Starch (Pregelatinized Waxy Maize Starch from American Maizo Corp.) | 7.82 |
| Salt | 2.0 |
| Baking Soda | 2.0 |
| Total | 427.97 |

The cookies are prepared as in Example 1. The water activity of the inner cookie dough prior to baking is 0.71. The water activity of the baked cookie is 0.45 (as measured 24 hours after baking). The total saccharide content of the soft, chewy portion of the baked cookie is about 36%. Of this amount, about 33% is comprised of monosaccharides, about 16% is comprised of di- and trisaccharides, about 6% is comprised of higher saccharides, and about 45% is comprised of sucrose. These cookies are also characterized by a soft chewy texture on the inside and a crispy texture on the outside. This textural dichotomy is retained over an extended shelf life of one year or more. The sweetness intensity profile of the chewy inner portion is surprisingly like that of a freshly made home-baked cookie. The chewy inner portion of this cookie is also resistant to sugar crystallization staling over an extended shelf-life.

Substantially similar results are obtained if the flour of this example is replaced with a synthetic flour, triticale, oat flour or corn flour.

EXAMPLE III

| Ingredient | Weight (grams) |
| --- | --- |
| Crisp Outer Dough | |
| Shortening ("Crisco" brand, The Procter & Gamble Company) | 150.0 |
| Granulated Sucrose ("Kroger" brand) | 112.5 |
| Brown Sugar ("Kroger" brand) | 112.5 |
| Fresh Egg Yolk | 27.0 |
| Dry Egg White Solids | 4.5 |
| Vanilla Flavoring | 3.0 |
| Distilled $H_2O$ | 40.5 |
| All Purpose Flour | 186.0 |
| Salt | 3.0 |
| Baking Soda | 3.0 |
| Total | 642.00 |
| Chewy Inner Dough | |
| Shortening ("Crisco" brand, The Procter & Gamble Company) | 100.0 |
| Granulated Sucrose ("Kroger" brand) | 67.5 |
| Isosweet 100 ® Corn Syrup (A.E. Staley Co.) | 48.7 |
| DE 62 ® Corn Syrup (American Maize) | 54.87 |
| Fresh Egg Yolk | 18.0 |
| Dry Egg White Solids | 3.0 |
| Vanilla Flavoring | 2.0 |
| Distilled $H_2O$ | 5.92 |
| All Purpose Flour | 116.18 |
| Starch (Pregelatinized Waxy Maize Starch from American Maizo Corp.) | 7.82 |
| Salt | 2.0 |
| Baking Soda | 2.0 |
| Total | 427.99 |

The cookies are prepared as in Example I. The water activity of the inner cookie dough prior to baking is about 0.70. The water activity of the baked cookie is about 0.45 (as measured 24 hours after baking). The total saccharide content of the chewy portion of the baked cookie is about 37%. Of this amount, about 35% is comprised of monosaccharides, about 14% is comprised of di- and trisaccharides, about 6% is comprised of higher saccharides and about 45% is comprised of sucrose.

These cookies are characterized by a soft chewy texture on the inside and a crispy texture on the outside. This textural dichotomy is retained over an extended shelf life of one year or more. The sweetness intensity profile of the chewy inner portion is surprisingly like that of a freshly made home-baked cookie. The chewy inner portion of this cookie is also resistant to sugar crystallization staling over an extended shelf-life.

Substantially similar results are obtained if the flour of this example is replaced in part with a synthetic flour, triticale, oat flour or corn flour.

What is claimed is:

1. A baked, sweetened food product in the form of a cookie, comprising a crumb-continuous matrix made from cookie ingredients, and characterized in having distributed therein discrete regions of crumb containing crystallized sugar and discrete regions of crumb containing uncrystallized sugar, said region containing uncrystallized sugar being characterized by from about 20 to about 60% of an uncrystallized saccharide mixture, which comprises, by weight of said saccharide mixture:

(1) from about 25 to about 60% monosaccharides selected from the group consisting of glucose, fructose, and mixtures thereof;
   (2) from about 10 to about 50% glucose-based di- and trisaccharides selected from the group consisting of maltose, isomaltose, maltotriose and other isomers of glucose-based trisaccharides, and mixtures thereof;
   (3) from about 4 to about 9% glucose-based tetra- and higher saccharides; and
   (4) from about 15 to about 60% sucrose;
   whereby the product provides a storage-stable plurality of textures, the regions containing crystallized sugar providing a crisp texture and the regions containing uncrystallized sugar providing a chewy texture.

2. A product according to claim 1 wherein the crystallized sugar is sucrose, or a mixture of sucrose and other mono- or disaccharides, comprising at least 75% sucrose by weight.

3. The product of claim 2 wherein the uncrystallized saccharide mixture comprises from about 35 to about 45% of said region of said snack product which is characterized by a chewy texture.

4. The product of claim 3 wherein the monosaccharides comprise from about 30 to about 50% of said uncrystallized saccharide mixture.

5. The product of claim 4 wherein the glucose-based di- and trisaccharides comprise from about 10 to about 40% of said uncrystallized saccharide mixture.

6. The product of claim 5 wherein the glucose-based tetra- and higher saccharides comprise from about 5 to about 7% of said uncrystallized saccharide mixture.

7. The product of claim 6 wherein sucrose comprises from about 30 to about 55% of said uncrystallized saccharide mixture.

8. The product of claim 7 wherein the uncrystallized saccharide mixture of said product is formulated from about 30 to about 35% of a high fructose corn syrup, from about 20 to about 25% of a high maltose corn syrup and from about 40 to about 50% of sucrose.

9. The product of claim 7 wherein the uncrystallized saccharide mixture of said product is formulated from about 25 to about 50% of a combination of dry fructose and dry glucose, from about 10 to about 40% dry maltose, from about 5 to about 7% dry corn syrup solids of tetra- and higher saccharides, and from about 15 to about 60% dry sucrose.

10. The product of claim 7 which further comprises from about 10 to about 30% of a shortening component.

11. The product of claim 10 wherein the shortening component contains a hydrogenated vegetable oil or a blend of hydrogenated oils having fatty acid chains containing froma bout 14 to about 20 carbon atoms.

12. The product of claim 11 wherein the hydrogenated vegetable oil is a blend of two or more hydrogenated oils selected from the group consisting of soybean, sunflower seed, safflower, corn, Canola, palm, coconut, palm kernel, peanut, olive, and cottonseed oil, and palm oil olein.

13. The product of claim 10 wherein the shortening component is comprised of about 10% to about 30% of a shortening having an SCI at 20° C. of from about 14.0 to about 20.0 and an SCI at 33° C. of from about 0.0 to about 8.0, in the crisp texture region, and from about 10% to about 30% of a shortening having an SCI at 21° C. of from about 12 to about 18.0 and an SCI at 33° C. of from about 0.0 to about 2.0, in the chewy texture region.

14. The product of claim 13 which comprises from about 16 to about 22% of a shortening having an SCI at 21° C. of from about 15.0 to about 19.0 and an SCI at 33° C. of from about 0.0 to about 3.0 in the crisp texture region, and from about 16 to about 22% of a shortening having an SCI at 21° C. of from about 13.0 to about 17.0, and an SCI at 33° C. of about 0 in the chewy texture region.

15. A product according to claim 1 wherein the weight ratio of dough providing the chewy crumb to dough providing the crisp crumb is in the range of from about 0.2:1 to about 5:1.

16. A product according to claim 15 wherein the weight ratio of doughs is from about 0.7:1 to about 2:1.

17. A product according to claim 15 which further comprises a member selected from the group consisting of cereals, nutmeats, peanut butter, cocoa, raisins, chocolate chips, butterscotch chips, and mixtures thereof.

18. A dough-based, ready-to-bake, sweetened food product in the form of a laminated dough structure, which, when baked, has a substantially homogeneous cross-section with respect to flavor and appearance and a shelf-stable cross-sectional texture variability typical of freshly baked cookies, comprising:
(a) a discrete body of a first cookie dough which comprises from about 20 to about 60% of a noncrystallizable saccharide component mixture comprising by weight of said saccharide mixture:
  (1) from about 25 to about 60% monosaccharides, selected from the group consisting of glucose, fructose, and mixtures thereof;
  (2) from about 10 to about 50% glucose-based di- and trisaccharides selected from the group consisting of maltose, isomaltose, maltotriose and other isomers of glucose-based trisaccharides, and mixtures thereof;
  (3) from about 4 to about 9% glucose-based tetra- and higher saccharides; and
  (4) from about 15 to about 60% sucrose; and
(b) a lamina of a second cookie dough superposed on at least a portion of the surface of said first cookie dough, said second cookie dough comprising a readily crystallizable sugar component.

19. A laminated dough structure according to claim 18 wherein the readily crystallizable sugar is selected from the group consisting of sucrose, and mixtures of sugars containing greater than about 75% sucrose by weight, and solutions thereof.

20. A method for making a laminated dough structure comprising:
(a) preparing a first cookie dough comprising from about 20 to about 60% of a noncrystallizable saccharide mixture, which comprises, by weight of said noncrystallizable saccharide mixture;
  (1) from about 25 to about 60% monosaccharides selected from the group consisting of glucose, fructose, and mixtures thereof;
  (2) from about 10 to about 50% glucose-based di- and trisaccharides selected from the group consisting of maltose, isomaltose, maltotriose and other isomers of glucose-based trisaccharides, and mixtures thereof;
  (3) from about 4 to about 9% glucose-based tetra- and higher saccharides; and
  (4) from about 15 to about 60% sucrose; and conventional amounts of flour and shortening;
(b) preparing a second cookie dough comprising a readily crystallizable sugar component and conventional amounts of flour and shortening; and
(c) applying a layer of said second dough to said first dough, thereby forming a laminated dough structure.

21. A method for making a cookie having a shelf-stable cross-sectional texture variability typical of freshly baked cookies, according to claim 20, which method further comprises the step of baking said laminated structure.

* * * * *